United States Patent
Vick et al.

(10) Patent No.: US 8,726,248 B2
(45) Date of Patent: May 13, 2014

(54) METHOD AND APPARATUS FOR ENREGISTERING MEMORY LOCATIONS

(75) Inventors: Christopher A. Vick, San Jose, CA (US); Gregory M. Wright, Mountain View, CA (US)

(73) Assignee: Oracle America, Inc., Redwood Shores, CA (US)

( * ) Notice: Subject to any disclaimer, the term of this patent is extended or adjusted under 35 U.S.C. 154(b) by 1455 days.

(21) Appl. No.: 12/138,088

(22) Filed: Jun. 12, 2008

(65) Prior Publication Data

US 2009/0313612 A1    Dec. 17, 2009

(51) Int. Cl.
*G06F 9/45* (2006.01)
*G06F 9/455* (2006.01)
*G06F 12/00* (2006.01)

(52) U.S. Cl.
CPC *G06F 8/52* (2013.01); *G06F 8/441* (2013.01); *G06F 8/40* (2013.01); *G06F 8/447* (2013.01); *G06F 9/4552* (2013.01); *G06F 12/00* (2013.01)
USPC .......................................... 717/147; 717/136

(58) Field of Classification Search
CPC ............. G06F 8/52; G06F 8/441; G06F 8/40; G06F 8/447; G06F 9/4552; G06F 9/45516
USPC .......... 717/101–178; 711/118, 124, 127, 203, 711/205; 712/201, 227; 703/20, 26–27; 710/100; 718/100; 713/400
See application file for complete search history.

(56) References Cited

U.S. PATENT DOCUMENTS

| | | | |
|---|---|---|---|
| 5,636,366 A * | 6/1997 | Robinson et al. | 711/163 |
| 5,659,753 A * | 8/1997 | Murphy et al. | 717/147 |
| 5,721,855 A * | 2/1998 | Hinton et al. | 712/218 |
| 5,953,520 A * | 9/1999 | Mallick | 703/26 |
| 5,966,539 A * | 10/1999 | Srivastava | 717/156 |
| 5,999,737 A * | 12/1999 | Srivastava | 717/162 |
| 6,021,273 A * | 2/2000 | Griesemer | 717/148 |
| 6,021,275 A * | 2/2000 | Horwat | 717/159 |
| 6,243,668 B1 * | 6/2001 | Le et al. | 703/27 |
| 6,535,903 B2 * | 3/2003 | Yates et al. | 718/100 |
| 6,625,807 B1 * | 9/2003 | Chen | 717/154 |
| 6,820,252 B2 * | 11/2004 | Sakamoto et al. | 717/136 |
| 6,907,601 B1 * | 6/2005 | Hoflehner et al. | 717/151 |
| 7,065,633 B1 * | 6/2006 | Yates et al. | 712/227 |
| 7,111,290 B1 * | 9/2006 | Yates et al. | 717/158 |
| 7,124,283 B2 * | 10/2006 | Yamada et al. | 712/209 |
| 7,219,336 B2 * | 5/2007 | Li et al. | 717/136 |
| 7,257,806 B1 * | 8/2007 | Chen et al. | 717/141 |

(Continued)

*Primary Examiner* — Lewis A Bullock, Jr.
*Assistant Examiner* — Francisco Aponte
(74) *Attorney, Agent, or Firm* — Park, Vaughan, Fleming & Dowler LLP; Mark Spiller (57) ABSTRACT

One embodiment of the present invention provides a system that improves program performance by enregistering memory locations. During operation, the system receives program object code which has been generated to use a specified number of registers that are available for a given target hardware implementation. Next, the system translates this object code to execute on a second hardware implementation which includes more registers than the first hardware implementation. The system uses these additional registers to improve the performance of the translated object code for the second hardware implementation. More specifically, the system identifies a memory access in the object code, and then rewrites an instruction associated with this memory access to access an available register instead of the original target memory location. To preserve program semantics, the system subsequently moderates accesses to the memory location to ensure that no threads access a stale value in the enregistered memory location.

18 Claims, 3 Drawing Sheets

(56) References Cited

U.S. PATENT DOCUMENTS

| | | | |
|---|---|---|---|
| 7,260,815 B1* | 8/2007 | Chen et al. | 717/134 |
| 7,275,246 B1* | 9/2007 | Yates et al. | 718/100 |
| 7,331,044 B2* | 2/2008 | Koseki et al. | 717/153 |
| 7,409,533 B2* | 8/2008 | Jones | 712/201 |
| 7,644,210 B1* | 1/2010 | Banning et al. | 710/100 |
| 7,681,187 B2* | 3/2010 | Ludwig et al. | 717/151 |
| 7,810,073 B2* | 10/2010 | Ehrman et al. | 717/126 |
| 7,813,909 B2* | 10/2010 | Sargaison et al. | 703/20 |
| 7,840,776 B1* | 11/2010 | Kelly et al. | 711/207 |
| 8,056,061 B2* | 11/2011 | Lee et al. | 717/136 |
| 8,127,121 B2* | 2/2012 | Yates et al. | 712/244 |
| 8,255,201 B2* | 8/2012 | Wang et al. | 703/23 |
| 2003/0237080 A1* | 12/2003 | Thompson et al. | 717/161 |
| 2005/0071823 A1* | 3/2005 | Lin et al. | 717/136 |
| 2006/0015855 A1* | 1/2006 | Kumamoto | 717/136 |
| 2006/0026380 A1* | 2/2006 | Doi et al. | 711/207 |
| 2006/0117275 A1* | 6/2006 | Jones | 716/1 |
| 2007/0038984 A1* | 2/2007 | Gschwind et al. | 717/136 |
| 2007/0169031 A1* | 7/2007 | Harris | 717/140 |
| 2007/0226720 A1* | 9/2007 | Chen et al. | 717/151 |
| 2007/0288909 A1* | 12/2007 | Cheung et al. | 717/136 |
| 2008/0172657 A1* | 7/2008 | Bensal et al. | 717/136 |
| 2008/0215856 A1* | 9/2008 | Gschwind et al. | 712/220 |
| 2008/0216073 A1* | 9/2008 | Yates et al. | 718/100 |
| 2009/0198935 A1* | 8/2009 | Arimilli et al. | 711/165 |
| 2009/0198937 A1* | 8/2009 | Arimilli et al. | 711/165 |
| 2009/0204785 A1* | 8/2009 | Yates et al. | 711/205 |

* cited by examiner

METHOD AND APPARATUS FOR ENREGISTERING MEMORY LOCATIONS

BACKGROUND

1. Field of the Invention

The present invention generally relates to techniques for improving program performance on computing devices. More specifically, the present invention relates to techniques that improve program performance by enregistering memory locations using additional registers.

2. Related Art

Binary translation techniques facilitate translating object code targeted for one hardware implementation to execute on another hardware implementation. For instance, such techniques facilitate translating a binary generated for one instruction set architecture (ISA) to a second ISA. While binary translation may involve significant overhead, it allows applications to be run transparently across different architectures without recompilation. Such techniques can simplify distributing program code across a wide range of architectures, and can be extremely useful when access to program source code is restricted.

Note, however, that a compiler typically generates object code to match the feature set of an intended target architecture. For instance, a compiler typically generates code which is optimized for the given number of registers available in the intended target architecture. Note that re-optimizing existing object code to take advantage of the different characteristics of a new target architecture is a complicated process which is typically not performed during binary translation. Hence, binary translation typically does not take full advantage of the resources available in the new target architecture. For instance, when a new target architecture includes more registers than the original intended target architecture, such additional registers may be left unused.

Hence, what is needed is a method that performs binary translation without the above-described limitations of existing techniques.

SUMMARY

One embodiment of the present invention provides a system that improves program performance by enregistering memory locations. During operation, the system receives program object code which has been generated for a given hardware implementation, and hence is optimized to use a specified number of registers that are available in that hardware implementation. Next, the system translates this object code to execute on a second hardware implementation which includes more registers than the first hardware implementation. The system then makes use of these additional registers to improve the performance of the translated object code for the second hardware implementation. More specifically, the system identifies a memory access in the object code, where the memory access is associated with a memory location. The system then rewrites an instruction associated with this memory access to access the available register instead of the memory location. To preserve program semantics, the system subsequently moderates accesses to the memory location to ensure that no threads access a stale value in the enregistered memory location.

In some embodiments, the available register and the memory location are associated with a first thread. When the system detects a second thread attempting to access the memory location, the system writes a current value stored in the available register to the memory location. After the memory location has been updated with the current value, the system allows the second thread to access the memory location.

In some embodiments, the system associates an identifier for the first thread with a memory page containing the memory location. In these embodiments, the system detects an attempt by a second thread to access the memory location by comparing the identifier of the accessing thread with the identifier associated with the memory page. When the identifier of the accessing thread does not match the identifier associated with the memory page, the system: writes the current value from the available register to the memory location; and rewrites the instruction to revert to accessing the memory location instead of accessing the available register.

In some embodiments, the system stores the identifier associated with the memory page in an entry in a translation lookaside buffer (TLB). This identifier and the current thread's identifier are compared during an address-translation operation that uses the TLB.

In some embodiments, the identifier can be a thread identifier or the identifier of a hardware strand which is associated with the thread.

In some embodiments, the system can rewrite the instruction either statically, prior to program execution, and/or dynamically, during program execution. While rewriting the instruction, the system may also update tracking information that identifies instructions in the program's object code that have been rewritten.

In some embodiments, the system performs runtime profiling to identify candidate memory locations which are likely to benefit from being enregistered. The system then enregisters a candidate memory location that has been determined to be most likely to improve program performance when enregistered.

In some embodiments, the system monitors access patterns for enregistered memory locations during program execution. This enables the system to adjust which memory locations are enregistered for the object code during program execution based on the monitoring feedback.

In some embodiments, the two hardware implementations use different instruction set architectures.

In some embodiments, the system may rewrite two or more instructions associated with one or more distinct memory accesses. For instance, the system may rewrite two or more instructions that are associated with two or more distinct memory accesses to the memory location to instead access the available register, and/or rewrite two or more complementary instructions that are used to access a single memory location to instead access the available register.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other mechanism capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Binary Translation

Processor registers can be accessed much more quickly than main memory storage. Hence, during program execution, a processor typically moves data from a main memory into registers, operates on this data, and then moves results back into the main memory. A program that is compiled to run on a processor that has a small set of available registers may need to access memory more frequently, because insufficient registers are available to store a large set of working values.

Binary translation techniques facilitate translating object code optimized for one hardware implementation (e.g., one ISA) to execute on another hardware implementation. Binary translation allows applications to be run transparently across different architectures without recompilation. Such techniques can simplify distributing program code across a wide range of architectures, and can be of extremely useful when access to program source code is restricted.

In some scenarios, the second (target) hardware implementation has more available registers than the original hardware implementation (for which the object code was originally generated). For instance, the object code may have been compiled for a machine with 32 registers (e.g., a SPARC microprocessor), but is to be translated to a second machine with 64 registers. In such scenarios, the performance of the translated code can be improved by using these extra registers to store values that otherwise would require memory accesses (e.g., local variables stored on the stack for a thread).

Note, however, that because a private set of registers is allocated for each thread, "enregistering" such values can cause problems in situations where other threads also need to access the same values. While each thread may be allocated a separate memory region (e.g., for a stack that stores local variables for the thread), these memory regions are typically not protected, and may be accessed by other threads. Note that programs may take advantage of such access capabilities to share information between a set of threads. However, because the set of registers granted to a thread are private to each thread, enregistering memory locations can violate the correctness of such sharing techniques. When a thread updates a register instead of a memory location (e.g., accesses an enregistered memory location), other threads that depend on the thread updating the memory location cannot see the updated value that has written into the register. In order to preserve program semantics, the system needs to ensure that accesses to enregistered values by other threads see the updated values stored in such registers.

Enregistering Memory Accesses

In one embodiment of the present invention, the system uses additional available registers in a target hardware implementation while preserving the memory model semantics for the program (from the context of the original hardware implementation). By using the additional available registers to store values that would otherwise be stored in memory, the system reduces memory traffic and reduces the access latency for such values. Hence, the described techniques improve program performance with minimal hardware and operating system modification. In an environment where a virtual machine performs dynamic binary translation, such changes are only visible to the virtual machine, and do not impact the operating system or the applications. Hence, the described system reduces the performance overhead of dynamic binary translation by speeding up the execution of translated programs.

In one embodiment of the present invention, the system moderates access to an enregistered memory location to detect attempts by other threads to access the memory location. Note that while a first thread may be able to access a memory region (e.g., a memory page) allocated to another thread (such as the second thread's local stack), such accesses are generally uncommon in practice, and the bulk of accesses to such a memory region will be by the thread that "owns" (e.g., is explicitly associated with) the memory page. While program analysis cannot prove that other threads will not attempt to access such memory pages, the system can be speculatively optimized for the common case where only the owning thread accesses such a memory pages. For instance, the system can use page-access restrictions to protect such memory pages and ensure that the system detects and correctly manages any attempted access by other (non-owning) threads. For example, the system may trigger a page-protection fault in response to an attempted access of a page by a non-owning thread. During this fault, the system can execute additional instructions that write a current value stored in an associated register back into an enregistered memory location, thereby ensuring that the accessing thread receives the correct value for the enregistered memory location.

Note that multiple threads in the same process may simultaneously execute instructions from the translated object code. Hence if a given instruction in the object code has been rewritten to enregister an associated memory location, this instruction will be replaced with a corresponding instruction with performs a register access in the context of both threads. However, the two sets of accesses do not overlap or cause any problems (e.g., contention), because the operating system typically allocates a separate memory page for each thread's local stack, and each thread is granted a separate (private) set of registers. Hence, both threads can simultaneously enregister the values in their respective local stacks using an available register.

In one embodiment of the present invention, the system detects attempts to access enregistered memory locations by using extra bits in a page-table entry of a translation lookaside buffer (TLB). For instance, the system may extend page-table entries to also store an identifier (ID) that indicates which thread "owns" the page, and can restrict other threads from accessing the page. Typically a memory location is either writable by any thread or marked to be read-only. The system extends the TLB so that when an ID is present in a TLB entry, the system read- and write-protects the associated page against access by any thread other than the thread associated with the ID. When another thread attempts to access an enregistered memory location in a protected page, the system pauses execution of the other thread and notifies the thread that owns the page that a value that is stored in a register needs to be flushed to the associated memory location. After this value has been written to the memory location, the system removes the page protection and allows the paused thread to continue.

Note that including IDs in TLB entries allows IDs to be checked during the address-translation process, and facilitates using existing page protection mechanisms to also protect enregistered values from other threads. Augmenting TLB entries with such identifiers supports the described techniques while requiring minimal additional hardware (e.g., an additional set of bits in each TLB entry and an additional compare operation during address translation).

Note also that the number of bits that need to be added to TLB entries to identify threads may vary based on the type of identifier used. Some embodiments of the invention may identify threads using a thread ID assigned to the thread by the operating system. However, because an operating system may support a large number of software threads, many bits may be needed to store such thread IDs. For instance, the operating system may identify threads using a 16-bit or 32-bit thread ID. Hence, storing such a thread ID in the TLB may require a large number of additional bits to be added to each TLB entry.

To alleviate this problem, one embodiment of the present invention identifies threads using a strand ID for the identifier (instead of the thread ID assigned by the operating system). Note that strands are sets of hardware constructs and resources that support (software) threads. During execution, threads execute and perform computations using the underlying hardware resources of an associated strand. The operating system time-slices threads to strands, for instance by assigning one or more strands to a task and then mapping threads to be executed for the tasks onto the strands. Note that while the number of threads available on a machine is only strictly limited by the size of the address space (e.g., a 32-bit architecture limits the system to an absolute maximum of $2^{32}$ thread IDs), the number of strands for a machine is limited for a given hardware implementation. For instance, each core in a multi-core processor might include eight hardware strands that all feed into a shared TLB. The set of strands is fixed and limited, and only threads that are actively mapped onto a strand can currently execute (and thereby access pages). Hence, the system can distinguish between the active threads in the system using the much smaller strand ID (instead of the thread ID) as an identifier in TLB entries. For instance, in the case of a system that supports seven hardware strands per core, only three additional bits need to be added to each TLB entry (in contrast to 32 bits for an operating system with 32-bit thread IDs). Hence, some embodiments of the system can use a strand ID as an identifier to reduce the size of identifiers that need to be stored in the TLB. Note that both a thread ID and an associated strand ID (for a thread executing on the resources of a strand) may be maintained in state associated with the strand, and may hence be readily available for comparison operations if needed.

In an alternative embodiment, on a single-stranded processor core, or when the TLB is not shared between strands, the system can compare identifiers without including extra bits in the TLB entries. Because only a single strand can access the TLB entries, the system already knows that only one strand (e.g., the only available strand which can access the TLB) is associated with the TLB entries, and hence does not need to store an ID for this strand in each of the TLB entries. Hence, the system can simply compare the identifier of another strand attempting to access an enregistered memory location with the identifier of the strand which has enregistered that location at the time that the other strand installs an entry in its TLB. Note that this is different from a shared TLB, where one thread may access a TLB entry for a page associated with another thread (thereby motivating the need for the system to compare the accessing thread's ID with the identifier in the TLB entry being accessed).

Figure 1:
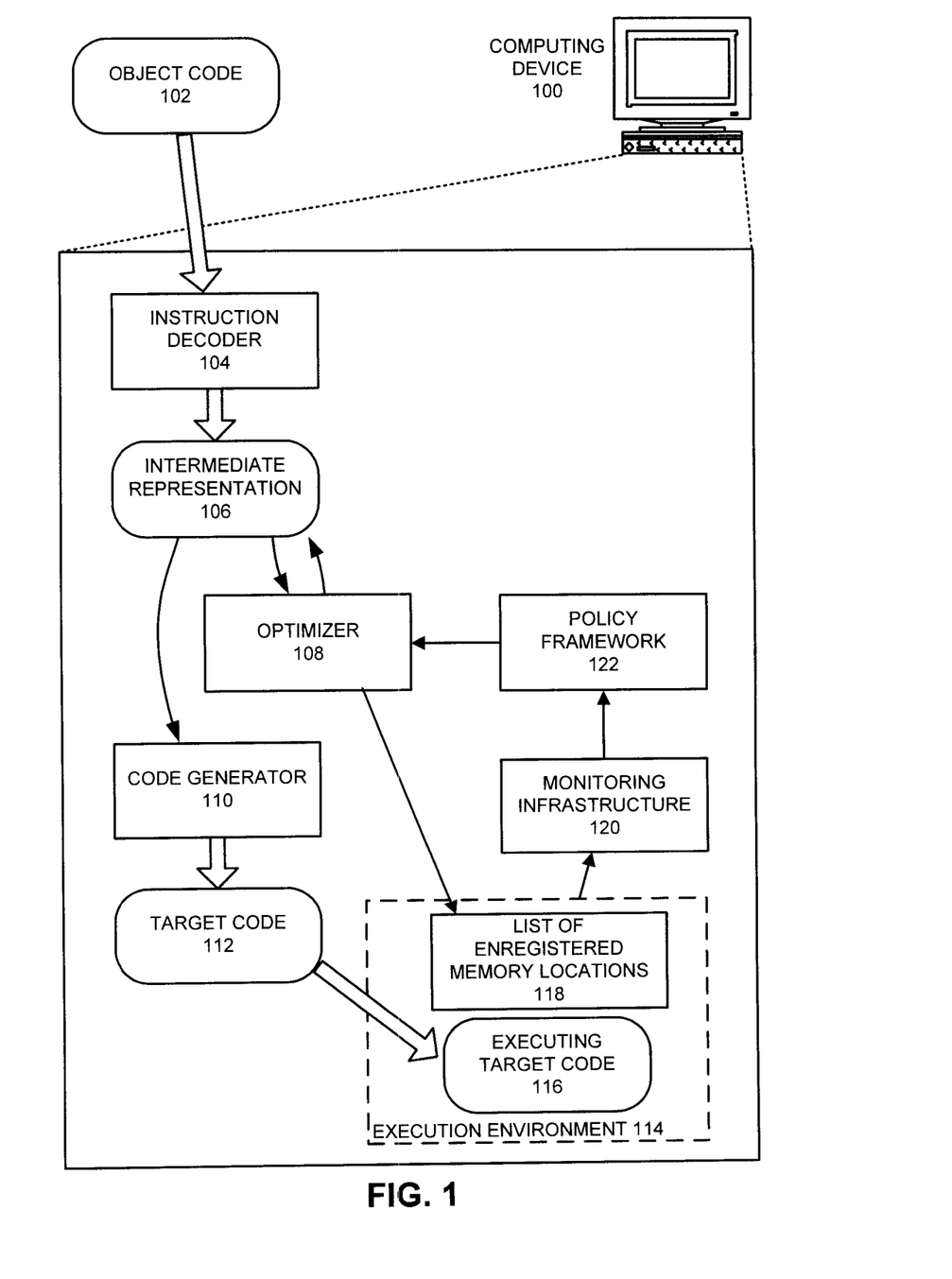
FIG. 1 presents an exemplary process for translating program object code and enregistering one or more memory locations in accordance with an embodiment of the present invention.

FIG. 1 illustrates an exemplary process for translating program object code and enregistering one or more memory locations. During operation, computing device 100 receives program object code 102 that has been compiled for a hardware implementation other than that of computing device 100. Object code 102 is received by instruction decoder 104, which decodes the instructions of object code 102 to create an intermediate representation 106 of the program. Optimizer 108 determines whether any additional registers are available, and if so, analyzes intermediate representation 106 to identify memory locations that can be enregistered. For instance, optimizer 108 may perform program analysis (e.g., by performing static code analysis, or by receiving profiling input generated during dynamic program analysis) to determine the set of memory locations that, when enregistered, are likely to most benefit program performance. Optimizer 108 then iteratively rewrites instructions in intermediate representation 106 to access the available registers instead of the memory locations. Note that multiple instructions may be rewritten to use a given available register. For instance, the system may rewrite two or more distinct load and/or store operations to the same memory address to access a single available register. Note that the system may also rewrite two or more complementary instructions that are associated with a single memory access. For instance, the original object code may include a two-instruction sequence that first computes a memory address, and then accesses the computed memory address. If this memory access is replaced by a register access, the first instruction may no longer be needed (although the page fault handler may still need to perform the address calculation in cases where the value in the register needs to be flushed to the memory location). Hence, a single enregistered memory location may replace a substantial number of instructions and/or memory operations for each available register, thereby magnifying the performance improvements of the described techniques.

After optimizer 108 has finished enregistering an initial set of memory locations (e.g., by using all of the available registers or running out of memory accesses to enregister), code generator 110 generates target code 112, which can execute on the underlying hardware of computing device 100. Note that while this example assumes target code 112 has been generated to execute on computing device 100, this process may also be performed to translate object code 102 to execute on a third machine (not shown) with yet another hardware implementation. After generating target code 112, the system can execute target code 116 in execution environment 114, which is aware of the set of enregistered memory locations 118. While executing target code 116, the system moderates accesses to these memory locations to ensure that threads attempting to access enregistered memory locations do not access stale values.

Note that the process for choosing memory locations to enregister is a policy choice. While the described techniques allow the system to enregister any memory location, the system may use a range of policies to determine the actual memory locations that are enregistered. For instance, the system may use runtime profiling techniques to identify frequently-accessed memory locations whose contents should be stored in registers to improve program performance. As mentioned above, such techniques may be applied statically (prior to execution) to predict appropriate memory locations to enregister and/or dynamically ("on-the-fly") while monitoring program behavior to determine and enregister the most-frequently accessed (unshared) memory locations.

FIG. 1 also illustrates how the system may use monitoring infrastructure 120 to perform ongoing monitoring and profiling for enregistered memory locations, and further optimize intermediate representation 106 and target code 112. For instance, if a large number of other threads access an enregistered memory location for a given thread, the system may de-optimize the associated memory location by rewriting the associated instruction to revert to using the memory location instead of a register. Alternatively, the system may determine that an enregistered memory location is not used very frequently, and that enregistering a different memory location might result in a more substantial performance improvement. In this case the system may undo the previous optimization, and enregister a different memory location. Such decisions may be determined using policy framework 122, which receives input from monitoring infrastructure 120 and feeds decisions into optimizer 108. Note that such adjustments can occur while executing target code 116, which can be updated with a modified version of target code 112 during execution.

Note that some mechanism is needed to track the set of enregistered memory locations, for instance to enable later modifications and/or adjustments, as well as to determine whether a register needs to be flushed for a given memory access. Moreover, the set of enregistered memory locations may be tracked and updated using different techniques. For instance, the enregistered memory locations may be annotated in intermediate representation 106. Alternatively, the set of enregistered memory locations could be stored in a separate list (or table) that is passed to or maintained by the optimizer 108 and/or execution environment 114.

Figure 2:
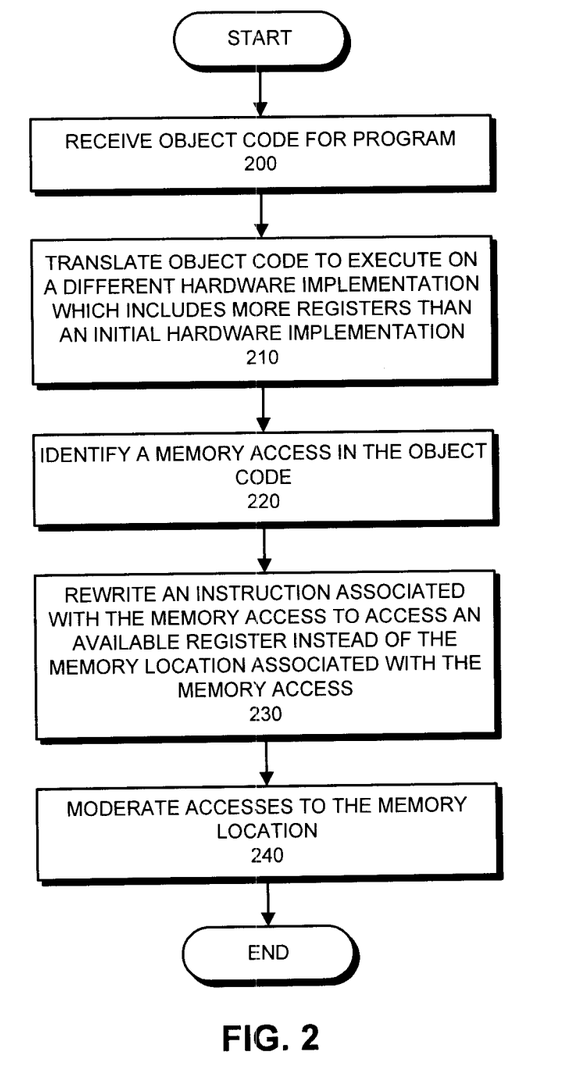
FIG. 2 presents a flowchart illustrating the process of enregistering a memory location in accordance with an embodiment of the present invention.

FIG. 2 presents a flowchart illustrating the process of enregistering a memory location. During operation, the system receives program object code which has been generated for a given hardware implementation (operation 200). The system translates this object code to execute on a second hardware implementation which includes more registers that the initial hardware implementation (operation 210). The system makes use of such an additional register to improve the performance of the translated object code for the second hardware implementation. Specifically, the system identifies a memory access in the object code (operation 220), where the memory access is associated with a memory location. The system then rewrites an instruction associated with this memory access to access the available register instead of the memory location (operation 230). To preserve program semantics, the system subsequently moderates accesses to the memory location (operation 240) to ensure that no threads access a stale value in the enregistered memory location.

Figure 3:
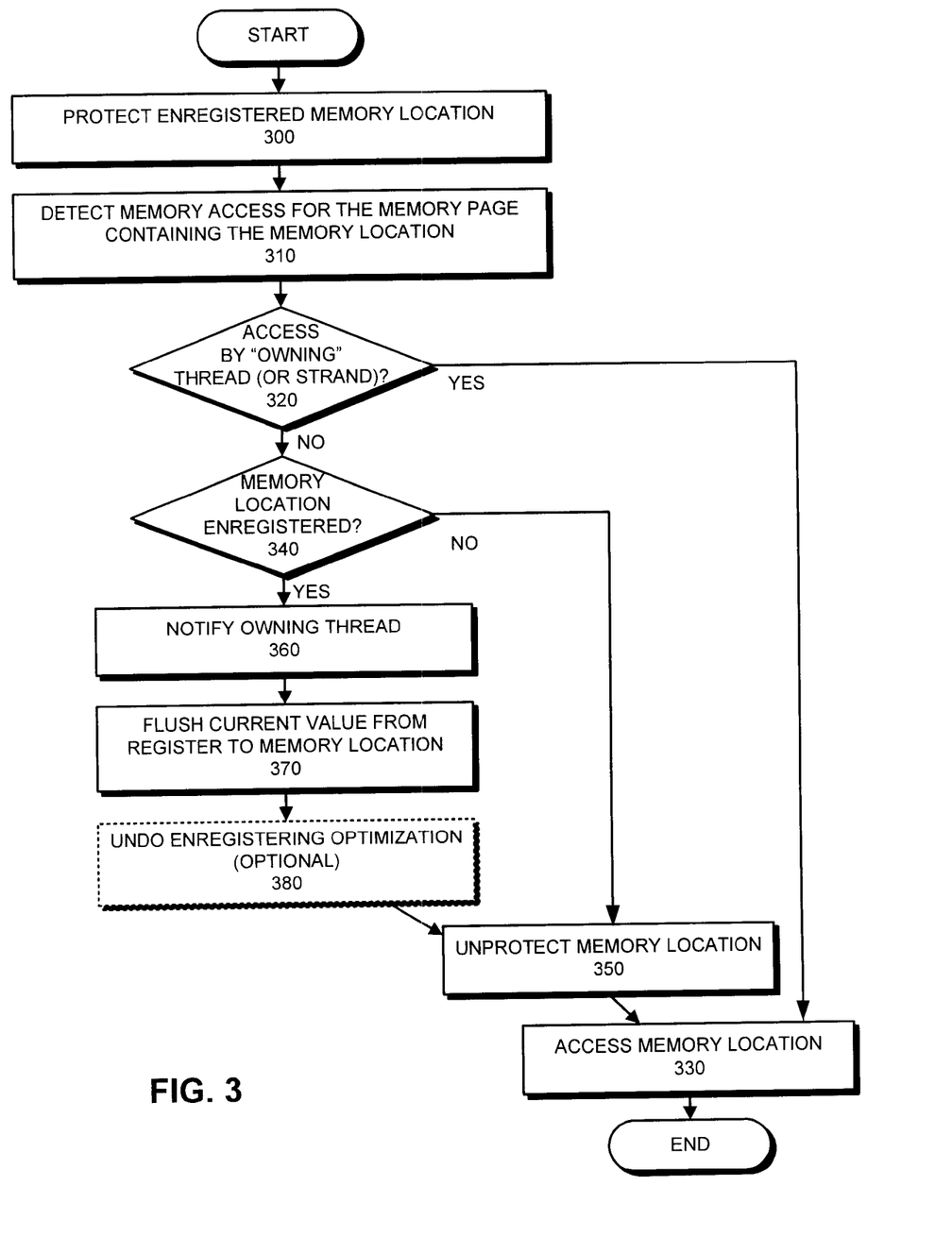
FIG. 3 presents a flowchart illustrating the process of accessing an enregistered memory location in accordance with an embodiment of the present invention.

FIG. 3 presents a flowchart illustrating the process of accessing an enregistered memory location. During operation, the system protects an enregistered memory location (operation 300), for instance by writing an identifier for the thread associated with the memory page containing the memory location into a TLB entry for the memory page and then setting one or more access control bits for the memory page to ensure that accesses by other threads will trigger a page fault. Subsequently, the system detects a memory access for the memory page containing the memory location (operation 310). The system then determines whether this access is being requested by the thread that is associated with the memory page (operation 320), for instance by comparing the identifier in the TLB entry with an identifier for the accessing thread while translating the address for the memory location. If so, the system allows the memory location to be accessed (operation 330), and the process completes. On the other hand, if the accessing thread is not the thread associated with the memory page, the attempt to access the protected page triggers a page fault, during which the system checks whether the specific memory location addressed by the access attempt is an enregistered memory location (operation 340). If the memory location is not enregistered, the value in the memory location is current, and the system can unprotect the memory location (operation 350) to allow the memory location to be accessed (operation 330). If, however, the memory location is enregistered (operation 340), the system notifies the owning thread (operation 360), which then flushes the current value in the register to the memory location (operation 370). (Alternatively, the system may directly update the memory location with the current value without notifying the owning thread). At this point, the system may also (optionally) undo the enregistering optimization for the memory location (operation 380) (e.g., if the system determines that the memory location is likely to be accessed again by non-owning threads). Finally, after the register's current value has been flushed to the memory location, the system can unprotect the memory location (operation 350) to allow the updated memory location to be accessed (operation 330).

Note that the system only momentarily unprotects a memory page during an attempted access by a non-owning thread. For instance, during the page fault, the system may temporarily unset the access control bits for the memory page to allow an accessing thread to access a memory location. However, after the value at the memory location has been read (while still handling the page fault), the system may immediately re-protect the page to ensure that subsequent accesses by other threads cannot directly access memory locations in the memory page, and will trigger another page fault. Note also that that when multiple enregistered memory locations occur in the same memory page, the system may flush the register values for all of these memory locations during the page fault (and prior to the access), to ensure that no stale values are read.

As mentioned above, in some embodiments of the present invention, the system may undo an enregistering optimization and rewrite a modified instruction to no longer use an available register (and instead revert to using load and/or store instructions). For instance, the system may determine that due to spatial locality of memory accesses an enregistered memory location accessed once by a non-owning thread is likely to be accessed again by such a thread. In such a scenario, the system may determine that the repeated overhead involved in flushing the register value is higher than the performance improvements associated with using the register. At this point, the system may use the register to enregister another unrelated candidate memory location, or simply choose to leave the register unused.

In some embodiments of the present invention, the system may provide "write-through" semantics for an enregistered memory location by automatically flushing values written to the associated register to the memory location. Automatically flushing such values ensures that later reads of the memory location will not incur additional delays from the store operation by guaranteeing that such values will always be up-to-date, thereby providing faster access to the value for other threads. Furthermore, such write-through operations allow the system to use registers more flexibly (e.g., by allowing the system to use the register for another operation without having to issue and wait for a store operation).

Note that the described techniques for enregistering memory locations are distinct from techniques that use special memory regions to store register values from prior activation records. While such techniques allow indirect access to an unbounded number of virtual "registers" (which may be located either in a register window or in main memory), they do not involve changes in the actual number of hardware registers actually available to a program, and hence do not improve program performance. In contrast, the described techniques permit memory values to reside in additional available registers and enable multi-threaded use of enregistered values while preserving memory model semantics.

In one embodiment of the present invention, the described techniques facilitate performing multiple updates atomically by allowing values to be placed in registers, updated, and then flushed back to memory when another thread attempts to read them. Note that the described techniques do not limit the execution region in which such "atomic" operations take place (e.g., to a specified shared memory region), and are not susceptible to failed or delayed writes that may occur for such shared memory locations in transactional memory systems.

In summary, one embodiment of the present invention leverages additional available registers following a binary translation of object code to a different hardware implementation. In doing so, the system rewrites instructions to replace memory accesses with register accesses for the common case (e.g., a thread accessing an unlikely-to-be-shared memory page) while maintaining the memory model semantics of the original program. The system moderates access to enregistered memory locations to ensure that an attempt by a thread to access a value from the enregistered memory location flushes the current value from the register back into the memory location. By transforming a number of frequent memory accesses into register accesses, the system improves program performance by reducing the amount of memory traffic (e.g., reducing the memory bandwidth used) and significantly reducing the associated memory latency.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for enregistering memory locations, comprising:
   receiving object code for a program, wherein the object code executes using a specified number of registers associated with a first hardware implementation;
   translating the object code to execute on a second hardware implementation, wherein translating the object code comprises determining that the second hardware implementation includes more registers than the first hardware implementation;
   identifying a memory access in the object code, wherein the memory access is associated with a memory location;
   rewriting one or more instructions associated with the memory access to access a data value for the program from an extra available register in the second hardware implementation instead of from the memory location, wherein the extra available register is associated with a first thread; and
   moderating accesses to the memory location to preserve the memory model semantics of the first hardware implementation by detecting an attempt by a second thread to access the memory location, wherein detecting the attempt comprises:
       during the attempted memory access, comparing an identifier for the first thread with an identifier for the second thread, wherein the identifier for the first thread is associated with a memory page containing the memory location; and
       when the identifier for the first thread and the identifier for the second thread do not match, performing at least one of:
           writing a current value that is stored in the extra available register to the memory location, and
           rewriting the one or more instructions to access the memory location instead of accessing the extra available register.

2. The method of claim 1, wherein moderating accesses to the memory location further involves:
   upon detecting the attempt by the second thread to access the memory location, allowing the second thread to access the memory location.

3. The method of claim 1,
   wherein the identifier for the first thread is stored in an entry of a translation lookaside buffer; and
   wherein the identifier for the first thread and the identifier for the second thread are compared during an address-translation operation.

4. The method of claim 1, wherein the identifier
   for the first thread comprises an identifier associated with a hardware strand which is associated with the first thread.

5. The method of claim 1, wherein rewriting the one or more instructions involves:
   rewriting the one or more instructions statically prior to program execution; or
   rewriting the one or more instructions dynamically during program execution; and
   wherein rewriting the one or more instructions additionally involves updating a set of tracking information that indicates the set of instructions that have been rewritten for the object code.

6. The method of claim 1, wherein identifying the memory access in the object code further involves:
   performing runtime profiling to identify a set of candidate memory locations which are likely to benefit from being enregistered; and
   enregistering a candidate memory location that is identified by the profiling as likely to improve program performance when enregistered.

7. The method of claim 6, wherein the method further involves:
   monitoring access patterns for enregistered memory locations during program execution; and adjusting which memory locations are enregistered for the object code during program execution.

8. The method of claim 1, wherein the second hardware implementation uses a different instruction set architecture from the first hardware implementation.

9. The method of claim 1, wherein rewriting one or more instructions associated with the memory access involves one or more of the following:
rewriting two or more instructions associated with two or more distinct memory accesses to the memory location to instead access the extra available register; and/or
rewriting two or more complementary instructions that are used to access the memory location to instead access the extra available register.

10. A non-transitory computer-readable storage medium storing instructions that when executed by a computer cause the computer to perform a method for enregistering memory locations, the method comprising:
translating the object code to execute on a second hardware implementation, wherein translating the object code comprises determining that the second hardware implementation includes more registers than the first hardware implementation;
identifying a memory access in the object code, wherein the memory access is associated with a memory location;
rewriting one or more instructions associated with the memory access to access a data value for the program from an extra available register in the second hardware implementation instead of from the memory location, wherein the extra available register is associated with a first thread; and
moderating accesses to the memory location to preserve the memory model semantics of the first hardware implementation by detecting an attempt by a second thread to access the memory location, wherein detecting the attempt comprises:
during the attempted memory access, comparing an identifier for the first thread with an identifier for the second thread, wherein the identifier for the first thread is associated with a memory page containing the memory location; and
when the identifier for the first thread and the identifier for the second thread do not match, performing at least one of:
writing a current value that is stored in the extra available register to the memory location, and
rewriting the one or more instructions to access the memory location instead of accessing the extra available register.

11. The non-transitory computer-readable storage medium of claim 10, wherein moderating accesses to the memory location further involves:
upon detecting the attempt by the second thread to access the memory location, allowing the second thread to access the memory location.

12. The non-transitory computer-readable storage medium of claim 10,
wherein the identifier for the first thread is stored in an entry of a translation lookaside buffer; and
wherein the identifier for the first thread and the identifier for the second thread are compared during an address-translation operation.

13. The non-transitory computer-readable storage medium of claim 10, wherein the identifier
for the first thread comprises an identifier associated with a hardware strand which is associated with the first thread.

14. The non-transitory computer-readable storage medium of claim 10, wherein rewriting the one or more instructions involves:
rewriting the one or more instructions statically prior to program execution; of
rewriting the one or more instructions dynamically during program execution; and
wherein rewriting the one or more instructions additionally involves updating a set of tracking information that indicates the set of instructions that have been rewritten for the object code.

15. The non-transitory computer-readable storage medium of claim 10, wherein identifying the memory access in the object code further involves:
performing runtime profiling to identify a set of candidate memory locations which are likely to benefit from being enregistered; and
enregistering a candidate memory location that is identified by the profiling as likely to improve program performance when enregistered.

16. The non-transitory computer-readable storage medium of claim 15, wherein the method further involves:
monitoring access patterns for enregistered memory locations during program execution; and
adjusting which memory locations are enregistered for the object code during program execution.

17. The non-transitory computer-readable storage medium of claim 10, wherein the second hardware implementation uses a different instruction set architecture from the first hardware implementation.

18. A computing device that includes a processor that enregisters memory locations, comprising:
a receiving mechanism configured to receive object code for a program, wherein the object code executes using a specified number of registers associated with a first hardware implementation;
a translation mechanism configured to translate the object code to execute on a second hardware implementation, wherein the translation mechanism facilitates determining that the second hardware implementation includes more registers than the first hardware implementation;
an identifying mechanism configured to identify a memory access in the object code, wherein the memory access is associated with a memory location;
a rewriting mechanism configured to rewrite one or more instructions associated with the memory access to access a data value for the program from an extra available register in the second hardware implementation instead of from the memory location, wherein the extra available register is associated with a first thread; and
a moderating mechanism configured to moderate accesses to the memory location to preserve the memory model semantics of the first hardware implementation by detecting an attempt by a second thread to access the memory location, wherein, while detecting the attempt, the moderating mechanism is configured to:
during the attempted memory access, compare an identifier for the first thread with an identifier for the second thread, wherein the identifier for the first thread is associated with a memory page containing the memory location; and
when the identifier for the first thread and the identifier for the second thread do not match, perform at least one of:
writing a current value that is stored in the extra available register to the memory location, and rewriting the one or more instructions to access the memory location instead of accessing the extra available register.

* * * * *